3,167,436
FERMENTATION SUSPENDING PROCESS
William M. Shanner, Carmel, Calif., assignor of forty-three and three-fourths percent to William M. Shanner and Harriet S. Shanner, jointly, Carmel, Calif., forty-three and three-fourths percent to Rudolph J. Hilgers and Eleanor M. Hilgers, jointly, Monterey, Calif., and twelve and one-half percent to Allan P. Murphy, Monterey, Calif.
No Drawing. Filed Apr. 23, 1962, Ser. No. 189,306
7 Claims. (Cl. 99—154)

The present invention relates generally to the art of agriculture and more particularly to a novel process for suspending fermentation or ripening in harvested fruits and vegetables.

A major factor in the retail price of fruit and vegetable products such as cantelopes, melons and the like is the necessity for maintaining these products refrigerated after they are harvested. If these products are not maintained refrigerated after harvesting, fermentation or ripening continues until the products spoil. The fermentation process utilizes oxygen that is trapped within the product during the growth stage. Refrigeration inhibits such fermentation.

It is a major object of the present invention to provide a fermentation suspending process which eliminates the need for refrigerating certain fruit and vegetable products.

Another object of the present invention is to provide a fermentation suspending process of the aforedescribed nature which is extremely economical.

Yet another object of the present invention is to provide a fermentation suspending process of the aforedescribed nature which does not change the taste, aroma or appearance of the fruit or vegetable product.

These and other objects and advantages of the present invention will become apparent from the following detailed description of a preferred embodiment thereof.

A preferred embodiment of the process of the present invention may be advantageously practiced with cantelopes or melons having a skin or rind that is relatively impervious to gaseous flow. This type of plant includes a central seed cavity which is defined by the body or meat of the product. The body or meat is in turn covered with a skin or rind.

It has been determined that a cantelope or melon ripens from the inside out, with such ripening utilizing air containing oxygen that is trapped in the seed cavity during the time that the product is on the vine. It is conventional after such products have been harvested to place them under refrigeration for delivery to a retail outlet. This refrigeration serves to slow down further fermentation or ripening. It is well known that the cost of providing such refrigeration is a major item in the final cost of the product.

In the practice of the present invention, fermentation of the harvested cantelope or melon is suspended by simply injecting a charge of inert gas into the seed cavity. Various types of inert gases may be utilized. It has been determined, however, that nitrogen, carbon dioxide or a mixture of both are particularly effective and likewise render the practice of the process commercially feasible. Other examples of inert gases useful with the process of the present invention are neon, argon or helium.

The inert gas may be introduced into the seed cavity by means of a hollow needle, such needle puncturing the rind and thereafter having its discharge hole positioned within the seed cavity. After the inert gas or inert gas mixture has been discharged within the seed cavity the hollow needle is withdrawn from the rind. Generally, the size of the aperture formed by the needle may be kept sufficiently small enough to restrain reverse flow of the inert gas out of the product. In some instances, however, it may be desirable to seal the puncture hole after the needle has been withdrawn. Such sealing may be effected by means of a pressure-sensitive adhesive tape or a suitable fast-curing adhesive paste or liquid.

By way of example, cantelopes have been treated in accordance with the process of the present invention utilizing nitrogen, utilizing carbon dioxide and utilizing a mixture thereof. A mixture of between 50 to 75% carbon dioxide to 50 to 25% nitrogen has proven effective. The inert gas or inert gas mixture was injected by means of a hollow needle formed with a gas passage of about .040 inch diameter. The gas was injected at a pressure of about 10 to 15 p.s.i. above atmospheric pressure. Approximately 30–40 cubic inches of gas was injected and this approximates several times the displacement of the seed cavity. The total time for making the injection varied between 10 to 20 seconds. The excess gas may be exhausted through a second needle or leak out the needle hole.

It should be noted that in some instances it may be desirable to at least partially evacuate the seed cavity of the gaseous contents thereof before or during the time that the inert gas is being introduced therein. Where the seed cavity is connected to a source of vacuum approximating 10 to 15 p.s.i. below atmospheric pressure as the inert gas is introduced, the time required may be reduced by approximately one-half. Desirably the seed cavity will be connected with the vacuum source by a second hollow needle. The aperture made by such second needle may also be sealed after the needle is withdrawn.

It is desirable in some instances to treat the rind with a suitable cleaning agent capable of rendering harmless any harmful bacteria or vermin that may be present on the rind before the inert gas is injected into the seed cavity. This precludes the possibility that such bacteria could be forced into the interior of the melon by the inert gas injecting and/or the vacuum source-connected needles. Preferably, such cleaning agent would also be a preservative for the rind. By way of example, sodium benzoate or sodium monoglutinate may be employed for this purpose.

When fruit and vegetable products are treated in accordance with the aforedescribed process it is not necessary to provide them with refrigeration, yet fermentation and further ripening process will be retarded or suspended just as if refrigeration were applied. The cost of carrying out the process of the present invention is considerably less than the cost of providing refrigeration. Accordingly, the retail price of fruit and vegetable products treated in accordance with the process of the present invention will be lower than where such products are refrigerated. It is important to observe that the injection of the inert gas does not change the taste, aroma or appearance of the product.

Various modifications and changes may be made with respect to the foregoing detailed description without departing from the spirit of the present invention or the scope of the following claims.

I claim:

1. A process for preserving cantelopes having a seed cavity and a skin which is impervious to gas flow that includes inserting needle means into said seed cavity to connect said seed cavity with a source of vacuum and concurrently with a source of inert gas whereby the oxygen originally disposed within said seed cavity is substantially replaced with said inert gas.

2. A process as set forth in claim 1 wherein said inert gas is injected at a pressure of about 10–15 p.s.i. above atmospheric pressure and said source of vacuum approximates 10–15 p.s.i. below atmospheric pressure.

3. A process as set forth in claim 1 wherein said inert gas is carbon dioxide.

4. A process as set forth in claim 1 wherein said inert gas is nitrogen.

5. A process as set forth in claim 1 wherein said inert gas is a mixture of nitrogen and oxygen.

6. A process as set forth in claim 1 wherein approximately 30–40 cubic inches of said inert gas is directed into said seed cavity.

7. A process as set forth in claim 1 wherein said skin is treated with a cleaning agent before said needle means is inserted into said seed cavity.

References Cited in the file of this patent

UNITED STATES PATENTS

| | | |
|---|---|---|
| 226,094 | Mefford | Mar. 30, 1880 |
| 1,232,271 | Franks | July 3, 1917 |
| 1,821,106 | Milani | Sept. 1, 1931 |